United States Patent [19]

Leiber

[11] Patent Number: 4,643,485
[45] Date of Patent: Feb. 17, 1987

[54] VEHICLE BRAKE SYSTEM INCLUDING MEANS FOR REDUCING DRIVE SLIP

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 673,830

[22] Filed: Nov. 21, 1984

[30] Foreign Application Priority Data

Feb. 6, 1984 [DE] Fed. Rep. of Germany ....... 3404018

[51] Int. Cl.⁴ ............................................ B60K 28/16
[52] U.S. Cl. ....................................... 303/96; 303/97; 303/111; 180/197
[58] Field of Search ................... 303/96, 97, 105, 106, 303/109, 103, 110, 111, 119; 180/197; 364/426

[56] References Cited

U.S. PATENT DOCUMENTS

| 3,582,152 | 6/1971 | Burckhardt | 303/96 |
| 3,604,760 | 9/1971 | Atkins | 303/109 |
| 3,606,492 | 3/1969 | Hayes | 303/96 |
| 3,637,264 | 1/1972 | Leiber et al. | 303/105 |
| 3,802,529 | 4/1974 | Burckhardt et al. | 180/197 |
| 3,893,535 | 7/1975 | Burckhardt et al. | 180/197 |
| 4,146,276 | 3/1979 | Brearley et al. | 303/97 |
| 4,395,761 | 7/1983 | Sato et al. | 303/106 |
| 4,416,347 | 11/1983 | Bertling et al. | 180/197 |

FOREIGN PATENT DOCUMENTS 1806671 7/1970 Fed. Rep. of Germany .
1483258 8/1977 United Kingdom .

Primary Examiner—Douglas C. Butler
Assistant Examiner—Alvin Oberley
Attorney, Agent, or Firm—Edwin E. Greigg

[57] ABSTRACT

A vehicle having wheels driven via a differential transmission, non-driven wheels and wheel brakes individually associated with the wheels and having wheel brake cylinders has an apparatus for reducing drive slip between the driven wheels and a road surface located beneath these wheels. The apparatus includes a control unit, which is connected to angular velocity wheel sensors for rotational wheel angle associated with the wheels and has at least one differentiating device, which emits control signals whenever drive slip exceeds a preselected switching threshold. By using the control unit, brake pressure control valves of the slipping wheels are controlled such that brake pressure in their wheel brakes builds up (P2). The pressure buildup is terminated as soon as the differentiating device ascertains that a drop of the angular wheel accelerations have dropped below a maximum value. Subsequently the brake pressure initially remains substantially constant. This has the advantage of avoiding the danger of abruptly choking off an internal combustion engine in the vehicle when the vehicle is being started up on a road surface having greatly varying traction.

6 Claims, 3 Drawing Figures

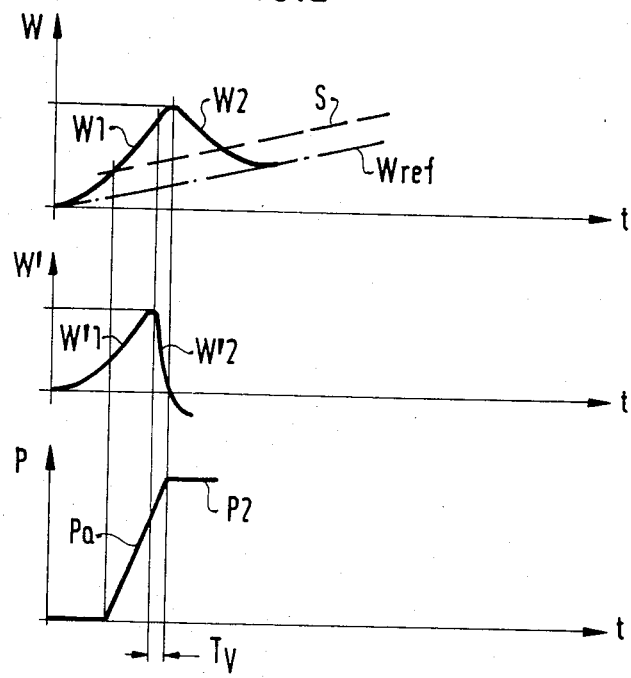
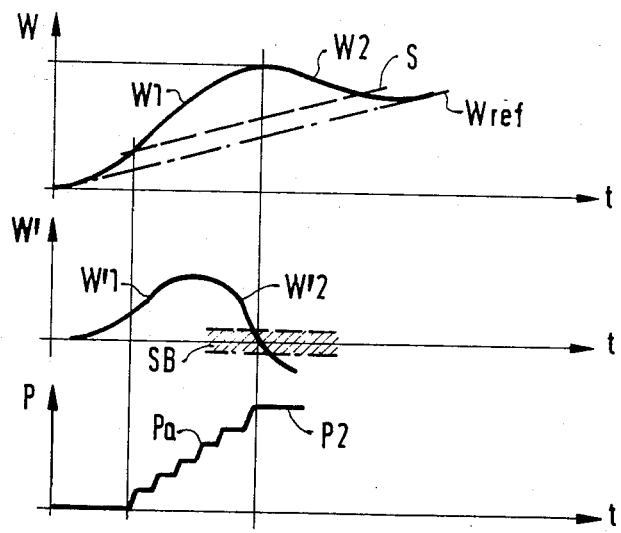

VEHICLE BRAKE SYSTEM INCLUDING MEANS FOR REDUCING DRIVE SLIP

BACKGROUND OF THE INVENTION

The invention is based on a vehicle brake system for reducing drive slip. An apparatus for reducing possible drive slip in the wheels has already been proposed, in German Pat. No. 18 06 671, for use in a vehicle having an internal combustion engine, a differential transmission and wheels which are driven by the differential transmission and with which wheel brakes are associated, and having at least one pressure reservoir as well as brake pressure control valves which have positions for buildup, maintenance and reduction of brake pressure. This apparatus includes means for measuring the angular velocities of the driven and the non-driven wheels; means for determining the magnitude of drive slip that occurs; and control switches which, if the magnitude of the drive slip exceeds a preselected upper switching threshold, moves the brake pressure control valve or valves of the slipping wheel or wheels into the positions for brake pressure buildup. If the slip value falls below this upper switching threshold, the brake pressure control valves are moved into their brake pressure maintenance position, and if the value falls below a second value, lower switching threshold, these valves are moved into the position for reducing brake pressure. This apparatus very quickly reduces drive slip to very low values. However, on road surfaces where the grip or traction varies, and especially while accelerating during startup using a friction clutch, this drastic reduction in drive slip can have the disadvantage that if the traction between the wheels and the road surface should increase suddenly, the vehicle engine will be braked down below its minimum rpm and will therefore stall. The engine will then have to be restarted and the vehicle started up and accelerated once again, yet the end result may be no different from before.

OBJECT AND SUMMARY OF THE INVENTION

The invention has the advantage over the prior art that the increase in brake pressure has already ended before the angular velocity of the slipping wheel or wheels drops disadvantageously. The goal, accordingly, is to attain brake pressures such that braking moments effected by such pressures are substantially identical in magnitude to the excesses in drive moment that cause the drive slip. These brake pressures are initially kept constant, thereby bringing about either a smooth termination of drive slip or gentle transitions to possible regulating cycles which may ensue, as the case may be.

The exemplary embodiment of the invention is preferred whenever the vehicle brake system, because of its structural features, experiences very rapid pressure increases in its brake cylinders. Despite unavoidable delays in moving the brake pressure control valves into their pressure maintenance positions, the control criterion selected avoids disadvantageously severe braking of the slipping wheels. As a result, the ending times of brake pressure increases substantially coinciding with the instants at which the maximum angular wheel velocities occur during the slippage phases.

The exemplary embodiment is preferred whenever the vehicle brake system typically undergoes relatively slow brake pressure increases.

The exemplary embodiment is also preferred whenever the brake pressure increases are not overly rapid, and it has the advantage that the ending times of the brake pressure rises substantially coincide with the instants at which the slip velocities attain their maximum value. A further development of the invention has the advantage that are further applicable to vehicle brake systems by means of which brake pressure increases required for emergency braking can be generated quickly, in an advantageous manner. The characteristics define an exemplary embodiment which is attainable without using expensive throttles and bypass valves. The pulse train generator, for instance, can be embodied by a digital computer already built into the vehicle brake system for other purposes, which performs control functions and can therefore be programmed additionally to emit the desired pulse trains.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 is a diagram showing the course over time of angular wheel velocities, slip and brake pressure for the brake system according to FIG. 1;
and
FIG. 3 is a diagram showing a second course of angular wheel velocity, slip and brake pressure.

DESCRIPTION OF THE PREFERRED EMBODIMENTS

Figure 1:
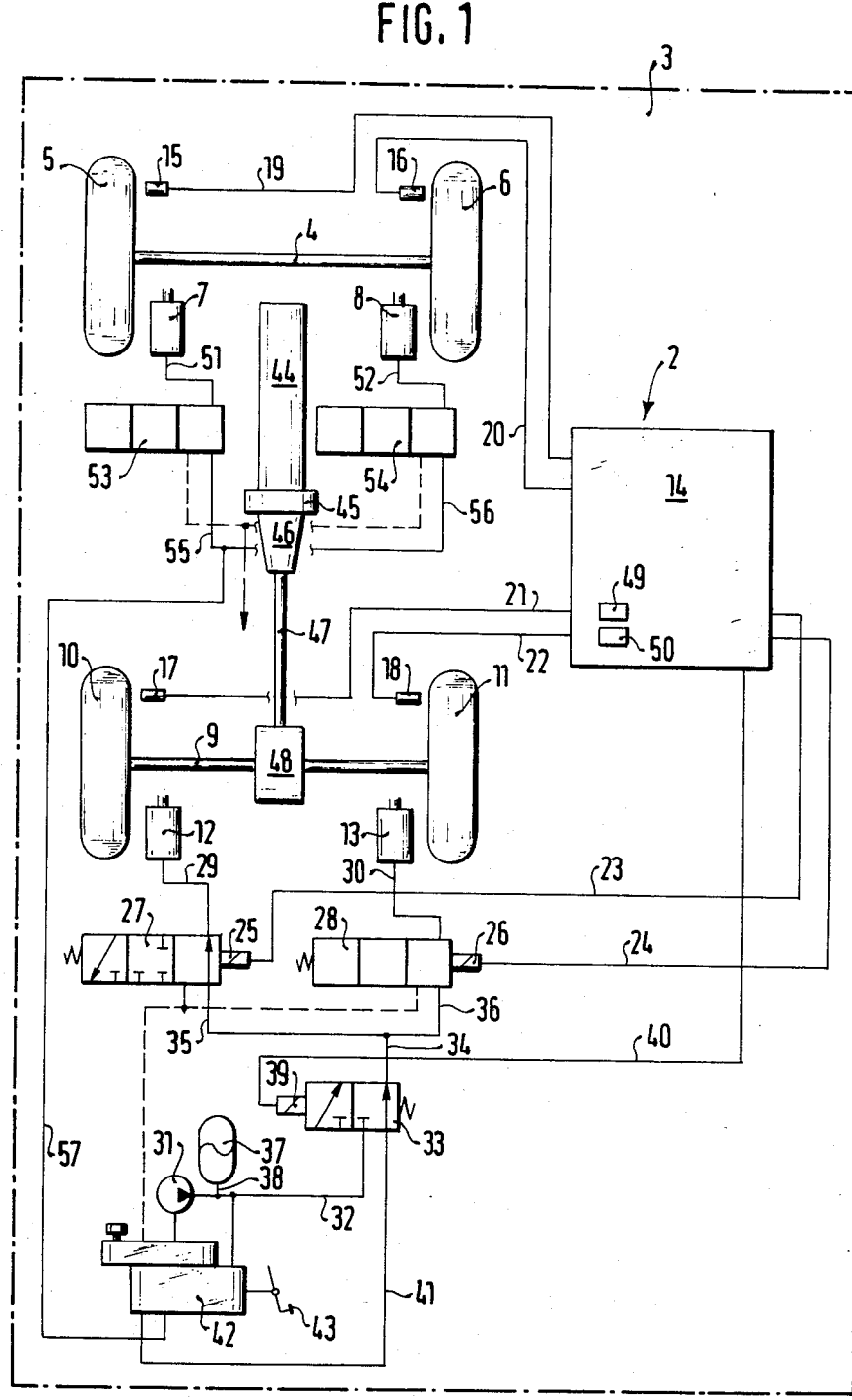
FIG. 1 shows a vehicle brake system.

The apparatus 2 for reducing drive slip is intended for a vehicle 3 having, for example, a front wheel axle 4 having wheels 5, 6, wheel brakes individually associated with these wheels but not shown, and wheel brake cylinders 7, 8 associated with the front wheel brakes. A rear wheel axle 9, rear wheels 10, 11 and wheel brakes associated with the rear wheels, but not shown, and wheel brake cylinders 12, 13 associated with the rear wheel brakes are included on the vehicle. The apparatus 2 has an electrical control unit 14, such as shown in U.S. Pat. No. 3,606,492 and British Pat. No. 1,483,258, which receives signals from rate of rotation sensors 15, 16, 17 and 18 positioned relative to the wheels for sensing the rate of wheel rotation having electric lines 19, 20, 21, 22 leading to the control unit 14 by which signals are directed to the electrical control unit. Electromagnets 25 and 27 controllable by means of signals from the control unit 14 via electric lines 23, 24 are intended for actuating brake pressure control valves 27, 28 which are connected to fluid pressure lines that control flow of brake fluid to the wheel brake cylinders 12 and 13, respectively, via lines 29, 30. A reversing electromagnetic controlled valve 33 which is controllable by an electromagnet 39 via an electric line 40 controls the brake fluid from pump 31 to the valves 27 and 28. The brake pressure control valves 27, 28 are embodied by way of example in the manner of anti-wheel lock or anti-skid valves in the form of well known 3/3-way valves, with one basic position for building up brake pressure, another position for maintaining brake pressure and a third position for decreasing brake pressure depending on the electrical current applied to the electromagnet. The brake pressure control valves 27, 28 are supplied with a pressure medium by a pump 31 via a line 32, the reversing valve 33 and lines 34, 35, 36. This pressure medium may be a fluid such as a well known brake fluid (liquid) or air. A pressure container 37 is connected via a tap line 38 to the line 32 in order to apply a uniform pressure to the line 32. The reversing valve is embodied as a well known 3/2-way valve and for its actuation it has an electromagnet 39, which is controlled by the control unit 14 via the electric line 40 for the evantuality that drive slip may appear at one or both of the wheels 10, 11. In that case, the reversing valve 33 then connects the line 32 with the line 34 within the reversing valve. In its basic position, this reversing valve 33 connects the line 34 with a line 41, which is supplied with brake pressure from a main brake cylinder 42 or some other pressure transducer, which is actuatable by means of an operating brake pedal 43.

The vehicle 3 is driven by an internal combustion engine 44 which acts upon the wheels 10 and 11, for instance via a friction clutch 45, a mechanical manual transmission 46, a universal joint-drive shaft 47 and a differential gear 48. With the engine running and the transmission 46 shifted into first gear, the vehicle 3 is set into motion by slowly engaging the friction clutch 45. The wheels 10 and 11 are made to rotate, and the vehicle 3 is accelerated. As long as the torque transmitted via the friction clutch 45 remains sufficiently slight, no notable slip occurs between the wheels 10 and 11 and the road surface located beneath them. As a result, signals from the sensors 17 and 18 for the wheel rotation will indicate angular wheel velocities which differ virtually not at all from those indicated by the sensors 15 and 16, which detect the rotational angle of the non-driven wheels 5 and 6. In this case, the control unit 14 remains inactive because the signals from sensors 15, 16 and 17, 18 are balanced. However, if the output of the engine 44 increases, causing the wheel 10, for example, to begin to slip relative to the road surface, then the control unit 14 is informed via the rotational wheel sensor 17 that the angular velocity of the wheel 10 is increasing. Means not shown are incorporated into the control unit 14 in a known manner for ascertaining signal differences due to slip variables, which can be derived from various signal trains of the wheel rotational angle sensors 15, 16 and 17. These means are embodied such that when a preselected switching threshold S is exceeded, a signal representing the sensor differences is emitted from the control unit 14 to electromagnet 39 via line 40 which excites the electromagnet 39. Electromagnet 39 operates control valve 33 such that pressure from the pressure container 37 reaches the wheel brake cylinder 12 via the pressure control valve 27. At the same time, the other brake pressure control valve 28 is moved out of its basic position into the position for brake pressure maintenance. As a result, the pressure in the wheel brake cylinder 12 begins to increase, which exerts an increasing braking moment upon the wheel 10. No pressure increase takes place in the wheel brake cylinder 13. The diagram in FIG. 2 illustrates the example of the increase of the angular wheel velocity W of the wheel 10 when slip beings to occur, as well as the brake pressure increase $P_a$ which begins after the switching threshold S, which is above the angular wheel velocity $W_{ref}$ of the wheels 5, 6, is exceeded. The effect of this increasing pressure $P_a$ is finally that the course of the angular wheel acceleration $W'1$, which caused the increase in angular velocity represented by the curve W1, begins to flatten out. A differentiating device 49 such as a one-channel trigger incorporated into the control unit 14 and associated with the wheel rotational angle sensor 17 is then switched on, when the threshold S is exceeded. A further pressure increase $P_a$ in the wheel brake cylinder 12 finally causes the rotational wheel angle acceleration $W'1$ to increase no further and instead to make a transition to a branching curve $W'2$. At the instant of the transition of the rising branch $W'1$ of the curve $W'$ to the falling branch $W'2$, the differentiating device 49 sends a signal to the control unit 14, whereupon the control unit 14, via the electrical line 23, directs the brake pressure control valve 27 into the position for brake pressure maintenance. Because of the unavoidable delays arising from elements following the differentiating device 49 inside the control unit 14 but not shown in the drawing, and because of switching delays in the brake pressure control valve 27, the brake pressure initially increases still further during a time period $T_v$. After that, the brake pressure remains substantially constant, as represented by the line P2 in FIG. 2. The effect is that the angular wheel velocity W of the wheel does not increase further and finally drops, as indicated by way of example by the branch curve W2.

In the same manner, in the event of slip occurring between the wheel 11 and the road surface, a further differentiating device 50, which is associated with the rotational wheel angle sensor 18, effects control of the valves 27, 28 and 33 via the control unit 14 and the lines 24 and 40. It is also possible that slip may occur at both wheels 10 and 11 simultaneously, causing the threshold S to be exceeded. Then, influence is exerted upon both wheel brake cylinders 12, 13 in order to reduce the angular velocity of the wheels.

In the illustrated exemplary embodiment, the wheel brake cylinders 12 and 13 are simultaneously components of a service brake system which includes the brake master cylinder 42. To effect service braking, which is initiated by means of the service brake pedal 43, the brake pressure control valves 27 and 28 are located in their positions for brake pressure buildup. The basic position for these valves 27 and 28 is therefore preferably the position for brake pressure buildup. As already noted, the brake pressure control valves 27, 28 may be embodied as anti-skid valves, and accordingly they may also be used as anti-skid means, that is, as means for preventing wheel locking. In that case, the wheel brake cylinders 7 and 8 are connected with the brake master cylinder 42 or brake pressure transducer via lines 51, 52, further anti-skid valves 53, 54 and lines 55, 56 and via a brake pressure line 57.

In the illustrated exemplary embodiment, the vehicle 3 is designed with rear wheel drive. Naturally it is equally possible for the vehicle instead to be embodied with front wheel drive or four wheel drive.

The portion of the above-mentioned time period $T_v$ resulting from elements inside the control unit 14 can for example be designed to be selectable, so that the increase in brake pressure that continues to take place from the time the differentiating device 49 or 50 responds until P2 is attained will terminate the drive slip gently. If the control unit 14 is designed with the use of a programmed computer, for instance, then the advantageous delay in the control signals can be accomplished by program by means of this computer. The differentiating devices 49, 50 can also be embodied by computers programmed for this purpose.

A second exemplary embodiment, which is not shown, differs from that shown in FIG. 1 primarily in that means not shown are disposed within the vehicle brake system which have the effect of slower brake pressure increases $P_a$. The speed of the brake pressure increase in the second exemplary embodiment may for instance be half that of the first exemplary embodiment. This can be attained by using throttles and bypass valves bypassing them, of the type known from anti-skid brake systems. The bypass valves enable more rapid pressure increases for emergency braking. The engineering expense is less if the brake pressure $P_a$, as shown in FIG. 3, is generated in stages. To this end, the computer of the control unit 14 is additionally programmed as a pulse train generator, so as to switch brake pressure control valve 27 or 28 over repeatedly for brief periods, such as to bring about brake pressure increases of the kind shown.

Because of the slower increase in brake pressure, the differentiating device 49 or 50 can be embodied such that it differentiates the angular wheel velocity, and if the maximum thereof is exceeded it then interrupts the brake pressure increase P. The consequence is a gentle decrease of drive slip. Alternatively, the differentiating devices 49, 50 may be embodied such that in the event of decreasing rotational wheel angle accelerations they emit signals to triggers, not shown. The triggers terminate the brake pressure increases $P_a$ whenever the rotational wheel angle accelerations have dropped sufficiently or disappeared. These triggers may likewise be realized by appropriate programming of the computer. The switching range SB of the triggers is shown in FIG. 3.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A vehicle brake system intended for a vehicle comprising a drive engine, at least one differential transmission, wheels driven via said transmission, said brake system having wheel brakes associated with at least said driven wheels, and brake pressure control valves individually associated with each of said wheel brakes, for brake pressure buildup, maintenance and reduction of brake pressure, a control unit for ascertaining angular wheel velocities and drive slip and for actuating said brake pressure control valves due to angular wheel velocity differences that exceed a switching threshold characterized in that said control unit includes a control device embodied as a differentiating device, which after said switching threshold is exceeded said control unit triggers at least one of said control valves to its pressure buildup position to cause braking of its associated wheel and thereafter when the maximum angular wheel acceleration of said associated wheel has been attained said differentiating device emits a control signal for directing said at least one brake pressure control valve into its position for brake pressure maintenance at such a time that braking moments attained substantially compensates for slip-generating excess drive moments.

2. A vehicle brake system as defined by claim 1, characterized in that said control unit includes a control signal delaying means between the differentiating device and at least one brake pressure control valve.

3. A vehicle brake system intended for a vehicle comprising a drive engine, at least one differential transmission, wheels driven via said transmission, said brake system having wheel brakes associated with at least said driven wheels, and brake pressure control valves individually associated with each of said wheel brakes, for brake pressure buildup, maintenance and reduction of brake pressure, a control unit for ascertaining angular wheel velocities and drive slip and for actuating said brake pressure control valves due to angular wheel velocity differences that exceed a switching threshold characterized in that said control unit includes a control device which includes an at least one-channel trigger, which after said switching threshold is exceeded said control unit triggers at least one of said control valves to its pressure buildup position to cause braking of its associated wheel and thereafter when the angular wheel acceleration of said associated wheel drops below an angular wheel acceleration threshold said at least one-channel trigger emits a signal directing said at least one brake pressure control valve into its position for brake pressure maintenance at such a time that braking moments attained substantially compensates for slip-generating excess drive moments.

4. A vehicle brake system as defined by claim 3, characterized in that means are associated with said brake pressure control valves which in the case of drive slip reduces the speed at which the brake pressure increases.

5. A vehicle brake system as defined by claim 4, characterized in that the means include a pulse train generator, which controls the brake pressure control valves for generating the brake pressure increase (P) which is delayed in stages.

6. A vehicle brake system intended for a vehicle comprising a drive engine, at least one differential transmission, wheels driven via said transmission, said brake system having wheel brakes associated with at least said driven wheels, and brake pressure control valves individually associated with each of said wheel brakes, for brake pressure buildup, maintenance and reduction of brake pressure, a control unit for ascertaining angular wheel velocities and drive slip and for actuating said brake pressure control valves due to angular wheel velocity differences that exceed a switching threshold characterized in that said control unit includes a control device embodied as a differentiating device, which after said switching threshold is exceeded said control unit triggers at least one of said control valves to its pressure buildup position to cause braking of its associated wheel and immediately after an attainment of the maximum angular wheel velocity of said associated wheel, said differentiating device emits a control signal which changes said at least one brake pressure control valve into its position for brake pressure maintenance at such a time that braking moments attained substantially compensates for slip-generating excess drive moments.

* * * * *